Figure 1:
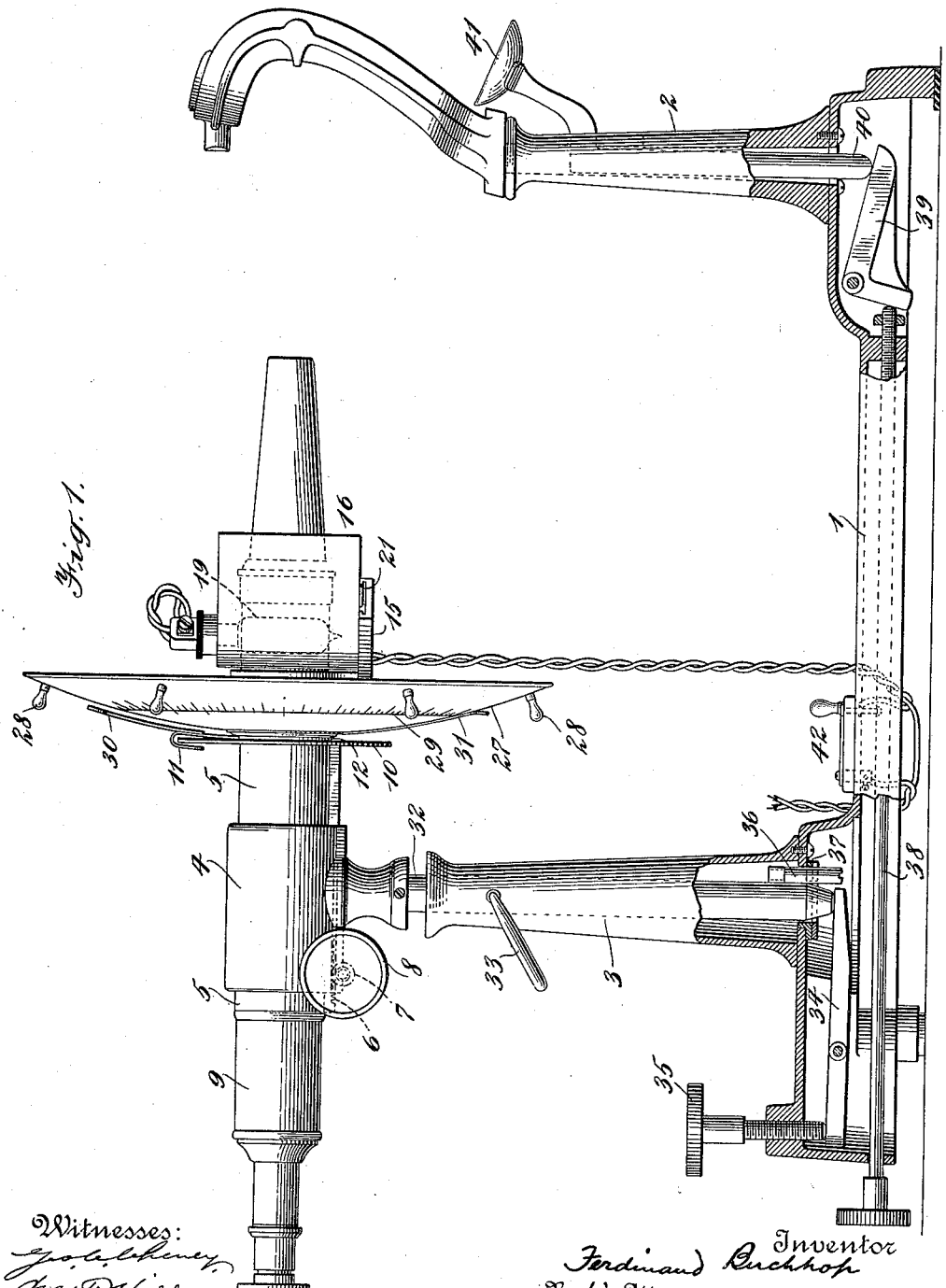

F. BUCHHOP.
OPHTHALMOMETER.
APPLICATION FILED MAR. 22, 1911.

1,006,825.

Patented Oct. 24, 1911.

3 SHEETS—SHEET 1.

Witnesses:

Inventor
Ferdinand Buchhop
By his Attorneys
Rosenbaum Stockbridge

F. BUCHHOP.
OPHTHALMOMETER.
APPLICATION FILED MAR. 22, 1911.

1,006,825.

Patented Oct. 24, 1911.

3 SHEETS—SHEET 3.

UNITED STATES PATENT OFFICE.

FERDINAND BUCHHOP, OF NEW YORK, N. Y., ASSIGNOR TO THE MEYROWITZ MANUFACTURING CO., A CORPORATION OF NEW JERSEY.

OPHTHALMOMETER.

1,006,825.  Specification of Letters Patent.  Patented Oct. 24, 1911.

Application filed March 22, 1911. Serial No. 616,114.

*To all whom it may concern:*

Be it known that I, FERDINAND BUCHHOP, a citizen of the United States, residing at the city of New York, in the borough of Brooklyn and State of New York, have invented certain new and useful Improvements in Ophthalmometers, of which the following is a full, clear, and exact description.

This invention relates to an improved means for adjusting movable parts of optical instruments, and more particularly that class of instruments which are ordinarily used for measuring the curvature of the eye, known as ophthalmometers. The special features of my invention, however, are applicable to perimeters, and to a wide variety of other instruments for precise measuring.

One of the objects of my invention is to provide an apparatus of this type in which the various adjusting means are controllable from parts disposed within convenient reach of the operator's hand, the location of such parts being substantially permanent, and practically unvaried under all circumstances and conditions.

A further object of the invention is to provide indicating means in connection with particular parts of the apparatus of the type hereinafter exemplified, which means are adapted to register the final result of the measuring process directly on a dial or scale, and without the exercise of any particular care on the part of the operator.

A still further object, and one which I deem of great importance, is to provide means for adjusting the movable parts of instruments of this and like description, which shall be of exceedingly simple construction, accurate, and most readily manipulatable; while still another object is to so form an operating part of the adjusting means just mentioned that the same may serve as a screen for the eye of the operator.

In an ophthalmometer it is usual to provide a pivotally mounted telescope which has certain prisms therein so arranged as to produce two images of an object instead of the usual single image of the ordinary form. The purpose of the instrument herein exemplified is to measure the curvature of the eye, which is done by determining the angle at which the surface of the eye cornea reflects the light of certain luminous objects, which reflected light is directed into the barrel of the telescope. The luminous objects used are known as the mires, and are mounted on a suitable frame in such manner as to be separable to different positions thereon. In many eyes the curvature in one plane is different from that in another. The purpose of my invention is, in this connection, therefore, mainly to facilitate the measurement of these curvatures and the variations thereof in different planes.

Figure 2:
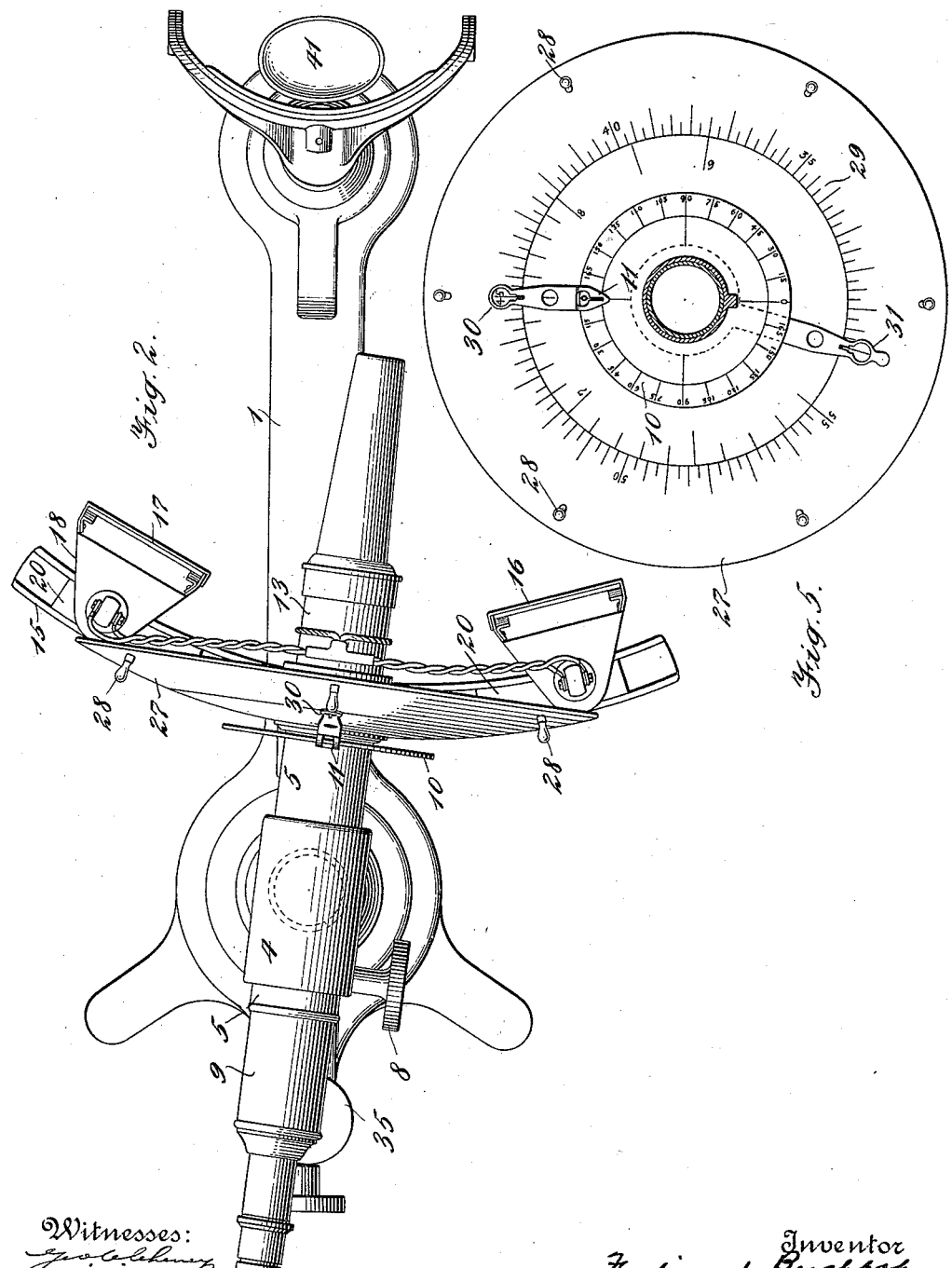
Figure 3:
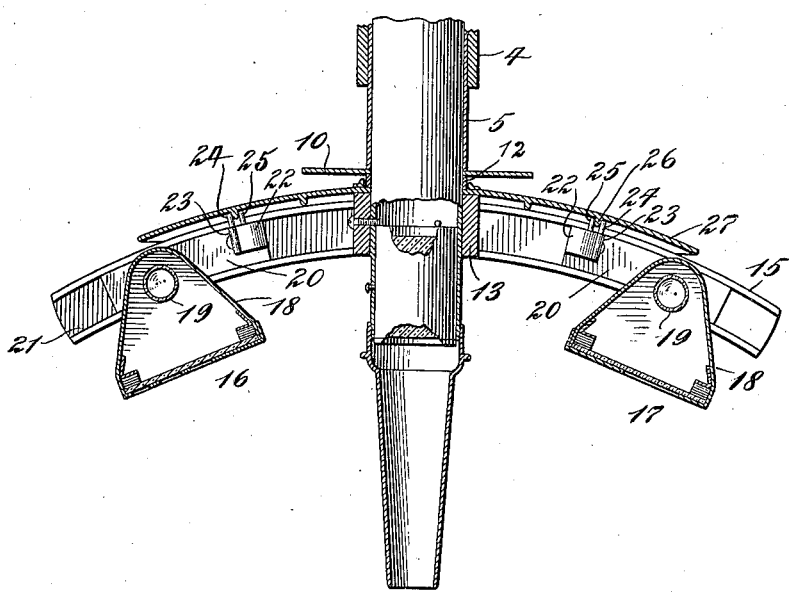
Figure 4:
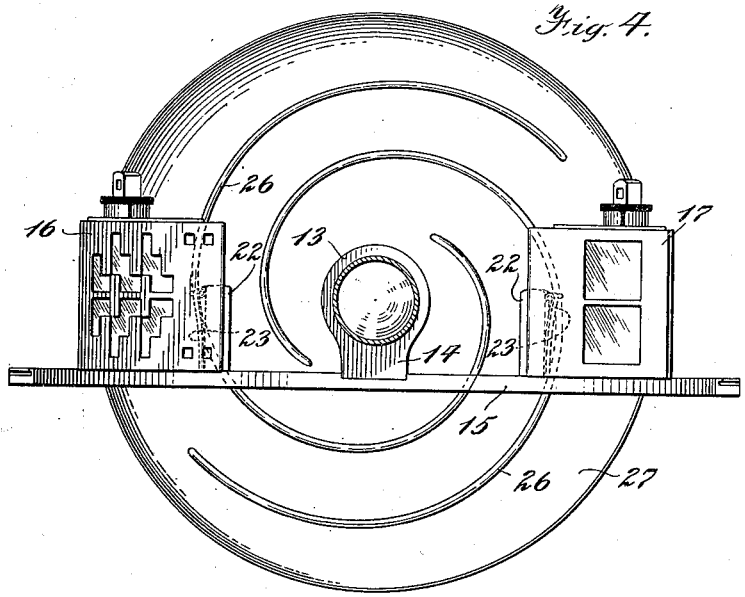

In the drawings which form a part hereof, and in which like reference characters designate like parts throughout the several views: Figure 1 is a side elevation of an ophthalmometer constructed in accordance with the principles of my invention. Fig. 2 is a plan of the same showing the telescope directed toward the point which an eye of the patient would occupy when the instrument is in use. Fig. 3 is a detail section of the novel mire adjusting mechanism taken substantially on the median line of the mires. Fig. 4 is a detail elevation of the mires and adjusting means thereof; and Fig. 5 is a detail of the scales.

Referring now to the drawings, a base board or table 1 is provided with standards 2 and 3; standard 2 carrying the head rest, which need not here be described, while the standard 3 carries a journal 4 in which is slidably mounted a sleeve 5, the latter being splined in said journal. Sleeve 5 carries a rack 6 which is in engagement with a pinion 7; a hand wheel 8 affording means for rotating this pinion and thereby adjusting the telescope longitudinally with respect to the eye to be examined.

The telescope 9 is rotatably mounted in the sleeve 5, but is frictionally held sufficiently tight to prevent inadvertent displacement. A graduated disk or dial 10 is firmly secured to the forward end of sleeve 5, and a pointer 11 is correspondingly secured to the telescope by means of a ring 12 so that as the telescope is rotated this pointer travels around the dial and indicates the angular displacement of the prisms in said cylinder with respect to a base plane, preferably the horizontal. The telescope has further fixedly secured thereto a ring 13 which is provided with a depending lug 14 which carries an arcuate frame 15 upon which are slidably mounted the mires 16, 17. In this exemplification of my invention these mires consist of casings 18 which are adapted for the reception of small incandescent lamps 19, said casings being mounted on arcuate slides or shoes 20, said shoes being firmly seated in the groove 21 of the arcuate frame, the walls of the groove being preferably undercut or flanged to this end. Each of the shoes 20 has an upright 22 preferably at its inner extremity to which is attached a leaf spring 23 which carries a pin 24 rearwardly projecting from the edge thereof; and the respective uprights also have fixed pins 25 which are adapted to co-act with the resiliently mounted pins 24 to grasp a rib or cam 26 of a dished element 27 therebetween. This dished cam element is revolubly mounted upon the telescope and constitutes one of the most essential features of my invention. The ribs or cams 26 thereof are preferably spiraled as shown in Fig. 4, two such ribs preferably, although obviously not necessarily, being provided.

The element 27 is preferably dished to substantially conform to the curvature of the arcuate frame, so that when the former is rotated, to facilitate which finger pieces 28 may be provided, the mires 16, 17 will be drawn toward or apart from each other according to the direction of rotation of the element.

The convex side of the dished element, or, as it may briefly be termed, the dish, is graduated as at 29 (see Fig. 5), and the pointer 11 has a pointer extension 30 by means of which the amount of rotative or angular displacement of the dish may be observed. In addition to these pointers which rotate with the telescope an auxiliary pointer 31 is rotatably mounted on the telescope and is adapted to normally move with the dish 27 being in frictional engagement therewith. In practice the dished element is movable together with the arcuate frame when the latter is rotated, but is further rotatable independently of this frame since the friction between the telescope and the sleeve 5 is materially greater than that between the dished element and said telescope. The remaining parts of the instrument need be but briefly referred to. The journal 4 is pivotally mounted upon the standard, a shaft 32 being provided for this purpose. A clamping device 33 serves to lock the telescope against inadvertent swiveling thereof. The lower end of shaft 32 bears against a lever 34 and an adjustment screw 35 coacts with these parts to afford vertical adjustment of the telescope; while a depending pin 36, carried by the shaft travels in a slot in an annular plate 37 and serves to limit the sidewise throw of the telescope. The forward extremity of a threaded rod 38 bears against one arm of a bell lever 39, the other arm of which supports the chin rest rod 40 which carries the chin rest 41; and a switch 42 is provided adjacent the standard 3 by means of which the mire lamps are controlled. The operator has hence every adjusting or controlling device within reach when operating the appliance.

The operation is as follows: The patient's chin is seated in the chin rest and the height of the latter adjusted so as to bring the eyes to the proper level. The telescope is next adjusted vertically, and sighted for the eye to be measured. Assuming that the operator desires to first measure the curvature of the eye in the horizontal plane; the telescope lenses will be adjusted for such plane by setting the pointer 11 at the zero mark of the dial 10. The operator now rotates the dished element to right or left as required to bring the images of the mires into proper relationship on the eye, as viewed through the telescope. This operation is very simple and may be performed with a minimum expenditure of time since there are no adjustment screws or the like to manipulate. The position of the pointer 30 on its scale 29, carried by the dished element indicates the separation of the mires and therefore the amount of curvature of the eye in the horizontal plane. Assuming now that it is desired to measure the curvature of the eye in the vertical plane, the arcuate frame will be turned about its pivotal axis through ninety degrees, the pointer 11 indicating the proper angle upon scale 10; and the dished element rotating with the frame and telescope. The relationship of the mires with respect to each other has hence not been changed. If the curvature of the eye in this plane is the same as in the horizontal plane, the images of the mires when viewed through the telescope will be unchanged; but if the eye is malformed a readjustment of the mires will be necessary which is accomplished by rotating the dished element the proper amount. Before this change is effected the auxiliary pointer 31 will usually be moved into alinement with pointer 11, so that when the dish is revolved the second time, as pointer 31 travels with it, the difference on the scale between pointers 30 and 31 will indicate the difference in curvature of the eye in the respective planes in which such curvature was measured.

What I particularly wish to emphasize is the extreme simplicity of the mire adjusting means; the construction employed obviating the use of expensive gear trains, and the like, heretofore used in instruments of this character; while affording the requisite degree of accuracy. The dished element performs a further function in that it acts as a screen for the eye of the operator.

It is to be understood that the term visualizing means used in the claims hereinafter set forth, refers, in the particular form of instrument herein exemplified, to the telescope, but obviously other visualizing means might be employed in appliances of an analogous character.

While the device herein specifically described is an ophthalmometer, I do not desire to be limited to such an apparatus nor to the particular construction of parts shown, as I am aware that various modifications and changes may be made within the purview of my invention and hence the scope of this invention is to be regarded as being limited only by the appended claims.

Having described my invention, what I claim, is:

1. In an instrument of the class described, a telescope, a revoluble cam element mounted thereon, the axis of said cam element being substantially coincident with the axis of the telescope, a frame secured to said telescope, mires carried by said frame, and cam engaging means for moving said mires toward and from each other when said cam element is rotated.

2. In an instrument of the class described, a telescope, a revoluble element having a spiraled cam thereon, a frame secured to said telescope, mires carried by said frame, and cam engaging means for moving said mires toward and from each other when said element is rotated.

3. In an instrument of the class described, visualizing means, mires symmetrically disposed with respect to said visualizing means, and mechanism for moving said mires toward and from each other in unison, said mechanism comprising a plate having a spiraled cam thereon, and connections between said mires and said cam, portions of said connections being resilient.

4. In an instrument of the class described, visualizing means, a mire disposed to one side of the normal path of light through said means, and mechanism for displacing said mire laterally with respect to said path, said mechanism comprising a revoluble cam element, and connections between said mire and said cam element, portions of said cam element being resilient.

5. In an instrument of the class described, visualizing means, a light emitting device disposed to one side of the normal path of light through said means, and mechanism for displacing said light emitting device with respect to said path, said mechanism comprising a revoluble cam element, and spring pressed cam engaging means.

6. In an instrument of the class described, visualizing means, a light emitting device disposed to one side of the normal path of light through said means, and mechanism for displacing said light emitting device with respect to said path, said mechanism comprising a revoluble dished element having a cam thereon, and an arcuate frame upon which said light emitting device is mounted.

7. In an instrument of the class described, visualizing means, a light emitting device disposed to one side of the normal path of light through said means, and mechanism for displacing said light emitting device laterally with respect to said path, said mechanism comprising an extended revoluble screen plate having means thereon for displacing said light emitting device.

8. In an instrument of the class described, a telescope, a frame carried thereby, mires movable toward and from each other over said frame, a revoluble screen plate disposed between said mires and the eye piece of said telescope, said plate having a spiraled cam thereon, and means adapted to coöperate with said cam for displacing one of said mires with respect to the other.

9. In an instrument of the class described, a revoluble telescope, an arcuate frame carried thereby, mires slidably mounted on said frame, mechanism for displacing said mires with respect to each other, said mechanism comprising a revoluble screen and a cam carried by said screen, means for indicating the angular displacement of said telescope, and means for indicating the amount by which said mires are separated.

10. In an instrument of the class described, visualizing means, a light emitting device disposed to one side of the normal path of light through said means, and mechanism for displacing said light emitting device with respect to said path, said mechanism comprising a revoluble element having a cam thereon, a frame upon which said light emitting device is mounted, and connections between said light emitting device and said cam.

11. In an instrument of the class described, a telescope, mires mounted adjacent thereto, means for supporting said mires, means for displacing said mires with respect to said telescope comprising a revoluble screen, a scale and a pointer for said scale, said screen also having graduations thereon adapted to co-act with said pointer, whereby the distance between said mires may be determined.

12. In an instrument of the class described, a revoluble telescope, a frame secured to said telescope and revoluble therewith, means for indicating the rotative displacement of said frame, mires mounted on said frame, means for varying the distance between said mires, said last mentioned means comprising a revolubly mounted screen and a cam carried by said screen, and means for determining the distance between said mires, said cam element being rotatable by said frame when the latter is revolved and being further movable independently of said frame.

In witness whereof, I subscribe my signature, in the presence of two witnesses.

FERDINAND BUCHHOP.

Witnesses:
WALDO M. CHAPIN,
JAMES DE ANTONIO.

Copies of this patent may be obtained for five cents each, by addressing the "Commissioner of Patents, Washington, D. C."